3,053,690
PROCESS FOR HARDENING FURAN RESINS
Fritz Jaffé, Koln-Braunsfeld, and Herbert Kaesmacher, Hehlrath, near Aachen, Germany, assignors to Spies, Hecker & Company, Koln-Raderthal, Germany, a corporation of Germany
No Drawing. Filed Jan. 20, 1959, Ser. No. 787,823
Claims priority, application Germany Jan. 21, 1958
5 Claims. (Cl. 117—72)

This invention relates to a process for hardening furan resins.

Furfuryl alcohol resins are known and are obtained by condensation of furfuryl alcohol. The condensation reaction can however only be controlled with difficulty, so that the furfuryl alcohol resins generally available contain difuryl methane or condensation products without terminal hydroxyl groups.

It has now been found possible successfully to produce well-defined furfuryl alcohol resins by condensation of furfuryl alcohol in the presence of acid catalysts if the condensation is carried out at temperatures between 40 and 60° C. and at a maximum of 65° C., with pH values of the aqueous phase from 2.0 to 2.5 (see United States application No. 725,639). Furfuryl alcohol resins produced in this way are reactive liquid substances of comparatively low molecular weight and can be used for lacquering purposes or for example for the impregnation of fibrous materials, with or without the addition of small quantities of solvents or, as disclosed in United States application No. 784,445, now abandoned, by addition of furfurol which serves as solvent and is simultaneously incorporated into the resin molecule.

For hardening purposes, such resins require an acid as catalyst, this acid being mixed with the resin prior to use. The keeping qualities of the mitxure are, of course, limited by the addition of acid and the resultant reduced pot life of the resin are disadvantageous for many purposes.

In connection with the gluing of wood, it is already known to use acid-hardenable urea resins by coating one of the wood surfaces to be united with a thin coating of an acid solution and the other with a thin coating of the urea resin. On pressing the two surface together, the urea resin and acid catalyst become mixed, so that the resin hardens. Acid-hardenable phenol resins are used in a similar manner.

It is known in the chain polymerisation of substances, such as low-molecular acryl resins or polyesters, which can be accelerated by free radicals, for the free-radical forming substances such as for example peroxides to be applied in a separate step, separately from the substance to be polymerised. In these cases, it is a question of a polymerisation reaction, but no parallel can be drawn between this reaction and the condensation reaction for hardening furan resins by acids. It is just this possibility of the separate use of the peroxide, which according to a prior proposal can even take place by inclusion of the peroxide in a binder, which has lead to the clear recognition that the polymerisation in these cases depends on a strict energy impulse excitation of the chain polymerisation, which then proceeds independently, so that in this case simple contact between the two layers is sufficient for completing the required polymerisation reaction.

It has now surprisingly been found that even when there is no positive mixing of both layers by pressing two layers together, as is for example the case when coating primed metal plates with hardener solution and thereafter separately applying the furfuryl alcohol resin, a satisfactory thorough hardening of the complete structure is obtained. This process is however not only capable of being used with the thin layers, such as those employed when gluing, but surprisingly also with relatively large layer thicknesses, such as those necessary for coatings having high resistance to corrosion, or with the even substantially thicker layers, such as are used in the manufacture of fibre-reinforced furan resin. In both cases, with the thicker coating or fibre fleece impregnation, no differences can be detected in the physical properties, irrespective of whether a conventional mixing process or the process according to the invention have been used. For example the elasticity values obtained, the adhesion and also the surface hardness conform satisfactorily in both cases.

A simplified flow diagram of the process is as follows:

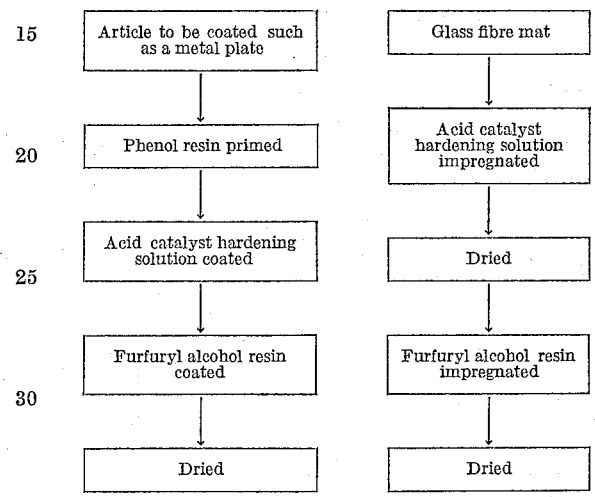

The possibility of being able to carry out the process of the invention was also not to be foreseen from the reaction occurring during the gluing operation for the following reason. Whereas the acid hardening of urea resins can undoubtedly only be carried out as a pure condensation reaction when the acid hardener is thoroughly mixed with the urea resin, the final hardening or curing of the furfuryl alcohol resins is based on two chemical reactions proceeding parallel to one another, namely the condensation at the terminal methylol groups produced by displacement of the pH value in the acid range and secondly on the polymerisation depending on alignment of the double bonds of the furan nucleus. It is only when both reactions proceed together that complete final hardening, also with large layer thicknesses, is produced with the furan resins.

In the process according to the invention, the pH value must therefore be so displaced through the entire furfuryl alcohol resin layer which is to be hardened that the condensation reaction takes place in the entire layer thickness. The occurrence of this surprising phenomenon could not be expected from what is known in the polymerisation art.

Infra-red exposure of furfuryl alcohol resins cured according to the invention have shown that after initial condensation, a polymerisation reaction by way of the double bonds of the furan nucleus can also take place with the hardening under heat. This is not however a chain polymerisation which can be excited by free radicals, but an addition polymerisation which occurs by change of pH value under supply of heat and in which the change in the pH value is necessary throughout the layer thickness.

Depending on the final purpose required, the process according to the invention can be carried out in many different ways. It can for example be used for coating surfaces, such as for example sheet metal plates or wood. Where circumstances require it, for example in the coating of sheet metal plates, a priming is preferably applied before the catalyst priming layer, the said priming on the one hand ensuring a better adhesion of the furfuryl alcohol resin layer to the foundation material and on the other hand protecting the foundation material against the action of the acid catalyst.

Another way in which the process can be carried out consists in the production of fibre-reinforced furfuryl alcohol resin. For this purpose, a glass fibre fabric or a glass fibre mat is for example impregnated by spraying or dipping with the catalyst solution, excess catalyst solution is if necessary squeezed out and then the furfuryl alcohol resin is applied in any desired manner, for example by using a lacquer casting machine.

Another use of the present process consists in the impregnation of textile fabrics.

The following examples further illustrate the invention and serve to explain some possible uses of the process.

*Example 1*

Initially, a furfuryl alcohol resin is prepared as follows (see United States application No. 725,639).

2500 g. of furfuryl alcohol are mixed with 1500 g. of water, the mixture is thoroughly stirred and then 1 litre of aqueous sulphuric acid (0.75 g. $H_2SO_4$/1) is added. The pH value of this mixture is 2.42. The mixture is now carefully heated while stirring vigorously to a temperature of 60° C. When this temperature is reached, the heating is shut off and the heat of reaction being liberated provides for the continuation of the condensation or polymerisation without the temperature rising substantially and in any case not above 65° C. After about 5 to 6 hours, the temperature starts to fall and then heat can be supplied for another 3 hours. It is possible for the temperature to fluctuate between 60 and 80° C. without any appreciable influence on the end product.

The resin which is obtained has a viscosity of 140 to 180 DIN-seconds and is particularly resistant to chemicals owing to its uniform molecule size and because of the low content of short-chain intermediate products. The consistency of the resin also does not increase appreciably after three months.

An intermediate hardener solution consisting of 97% ethyl acetate and 3% concentrated sulphuric acid (d.=1.84) is sprayed on to a sheet metal plate provided with a conventional phenol resin priming. After evaporation of the solvent, an intermediate furfuryl alcohol resin is applied, this resin having been adjusted by means of ethyl acetate to a viscosity of 25 DIN-seconds. The air-dried and cured material shows the same physical properties as the coating produced in the mixing process. With a layer thickness of 40μ, the surface hardness after 7 days was 170 pendulum-seconds.

*Example 2*

A sheet metal plate prepared as in Example 1 is treated with an intermediate layer of hardener solution (composition as in Example 1) and then four intermediate coats of the furfuryl alcohol resin solution as in Example 1 are sprayed on. After curing in an oven at 100° C. for 60 minutes, the surface hardness was 190 pendulum-seconds with a layer thickness of 160–180μ. A metal plate prepared by way of comparison by the mixing process showed the same pendulum hardness under the same conditions.

*Example 3*

A glass fibre mat is impregnated with the hardener solution described in Example 1, and after evaporating the solvent (15 minutes), the mat is dipped into the liquid furfuryl alcohol resin and jabbed strongly with a brush to remove the air. In this way, several layers of glass fibres can be impregnated with furfuryl alcohol resin for the purpose of producing a composite element. It is possible for the curing to take place in an oven or in air.

When carrying out the process, furfurol instead of the volatile solvents mentioned in the examples can be added to the furfuryl alcohol resin and to the hardener (see United States application No. 784,445, now abandoned. Such an addition of furfurol has the advantage that the furfurol does not have to be evaporated as do the other solvents, but can remain in the mixture and reacts with the other resin constituents without deleteriously affecting the good properties of the furfuryl alcohol resin. It is not necessary to replace the entire quantity of solvent by furfurol, but furfurol and other solvents can be used together.

What we claim is:

1. A process for hardening furfuryl alcohol resins consisting essentially of furfural alcohol molecules condensed in the presence of an acid catalyst as hardening agent, which comprises first applying to the article to be coated a coating consisting of said acid catalyst hardening agent, thereafter superimposing on said catalyst layer a coating of said furfuryl alcohol resin and in the absence of any positive mixing of said coatings effecting the curing of said furfuryl alcohol resin coating.

2. Process according to claim 1, wherein said acid catalyst hardening agent is applied in solution in a volatile solvent.

3. Process according to claim 2, wherein said acid catalyst is applied dissolved in furfurol.

4. A process for coating an article with furfuryl alcohol resins, which comprises applying to the article to be coated a priming coat consisting of a phenol resin, spraying the primed article with a solution of an acid catalyst hardening agent consisting of about 97 parts of ethyl acetate and about 3 parts of concentrated sulfuric acid, evaporating the ethyl acetate and thereafter applying to the article a coating of furfuryl alcohol resin, which resin has been obtained by the condensation reaction of about 25 parts by weight of furfuryl alcohol, about 15 parts by volume of water and about 10 parts by weight of aqueous sulfuric acid.

5. A process for impregnating a glass fiber mat with a furfuryl alcohol resin, which comprises impregnating the mat with an acid catalyst hardening agent consisting of about 97 parts of ethyl acetate and about 3 parts of concentrated sulfuric acid, evaporating the ethyl acetate and thereafter impregnating the mat with a furfuryl alcohol resin, which resin has been obtained by the condensation reaction of about 25 parts by weight of furfuryl alcohol, about 15 parts by volume of water and about 10 parts by weight of aqueous sulfuric acid.

References Cited in the file of this patent

UNITED STATES PATENTS

| | | |
|---|---|---|
| 2,123,152 | Rivat | July 5, 1938 |
| 2,242,218 | Auer | May 20, 1941 |
| 2,380,239 | Howald | July 10, 1945 |
| 2,424,284 | Olpin et al. | July 22, 1947 |
| 2,501,995 | Dillehay | Mar. 28, 1950 |
| 2,813,846 | Faber et al. | Nov. 19, 1957 |
| 2,930,106 | Wrotnowski | Mar. 29, 1960 |

OTHER REFERENCES

Reineck: Modern Plastics, October 1952, pp. 127, 128, 130, 132, 195 and 198.